United States Patent
Blunt et al.

(10) Patent No.: US 9,597,616 B2
(45) Date of Patent: Mar. 21, 2017

(54) FLUID FILTER AND HEAD WITH QUICK CONNECTOR

(71) Applicant: CUMMINS FILTRATION IP, INC., Columbus, IN (US)

(72) Inventors: Joel M. Blunt, Lebanon, TN (US); Ricky England, Sparta, TN (US); Chad T. Brummitt, Algood, TN (US); Gregory Shope, Cookeville, TN (US); Rahul Kallurwar, Columbus, IN (US); Philip S. Hall, Cookeville, TN (US); Chad M. Thomas, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 591 days.

(21) Appl. No.: 14/050,690

(22) Filed: Oct. 10, 2013

(65) Prior Publication Data

US 2014/0102967 A1    Apr. 17, 2014

Related U.S. Application Data

(60) Provisional application No. 61/712,988, filed on Oct. 12, 2012.

(51) Int. Cl.
| | |
|---|---|
| *B01D 29/11* | (2006.01) |
| *B01D 35/30* | (2006.01) |
| *B01D 27/08* | (2006.01) |

(52) U.S. Cl.
CPC ............ *B01D 29/114* (2013.01); *B01D 27/08* (2013.01); *B01D 35/30* (2013.01); *B01D 2201/302* (2013.01)

(58) Field of Classification Search
CPC ...... B01D 29/114; B01D 35/30; B01D 27/08; B01D 2201/302; B01D 2201/34; B01D 2201/347; B01D 2201/304
(Continued)

(56) References Cited

U.S. PATENT DOCUMENTS

| | | |
|---|---|---|
| 7,540,956 B1 | 6/2009 | Kurth et al. |
| 2004/0129627 A1 | 7/2004 | McGibbon |

(Continued)

FOREIGN PATENT DOCUMENTS

| | | |
|---|---|---|
| CN | 102083510 A | 6/2011 |
| WO | WO9316315 A | 8/1993 |
| WO | WO-2010/123344 | 10/2010 |

OTHER PUBLICATIONS

Provisional Patent Application "Quick Connect Filters and Filter Assemblies", U.S. Appl. No. 61/751,319, filed Jan. 11, 2013.
(Continued)

*Primary Examiner* — Madeline Gonzalez
(74) *Attorney, Agent, or Firm* — Foley & Lardner LLP

(57) ABSTRACT

A connection between a fluid filter and a head is described that permits quick connection/disconnection between the two without requiring disconnection of fluid lines from the head. The head includes a lock to connect inlet and outlet fluid lines to a fluid filter using a non-threaded attachment method. The lock that retains the head to the fluid filter is flexible to allow for connection and disconnection. The head has fluid inlet and outlet ports to which fluid lines attach to flow unfiltered fluid into and filtered fluid out of the fluid filter when the head is connected to the fluid filter. The head closes the fluid filter, which has a protrusion with adjacent passageways that guide and separate unfiltered from filtered fluid.

14 Claims, 4 Drawing Sheets

(58) Field of Classification Search
USPC .......................... 210/232, 435, 440–444, 450
See application file for complete search history.

(56) References Cited

U.S. PATENT DOCUMENTS

| | | |
|---|---|---|
| 2006/0053756 A1 | 3/2006 | Hawkins et al. |
| 2006/0113235 A1 | 6/2006 | Strohm et al. |
| 2007/0000829 A1 | 1/2007 | Boisvert |
| 2009/0236277 A1* | 9/2009 | Kurth .................... C02F 9/005 210/234 |
| 2010/0200490 A1 | 8/2010 | Martin et al. |
| 2011/0024344 A1 | 2/2011 | Thomas et al. |

OTHER PUBLICATIONS

International Search Report and Written Opinion for International Application No. PCT/US2013/064300, dated Jan. 20, 2014, 9 pages.
First Office Action and English Language Translation for Chinese Patent Application No. 2013800497554, issued Nov. 26, 2015, 16 pages.

\* cited by examiner

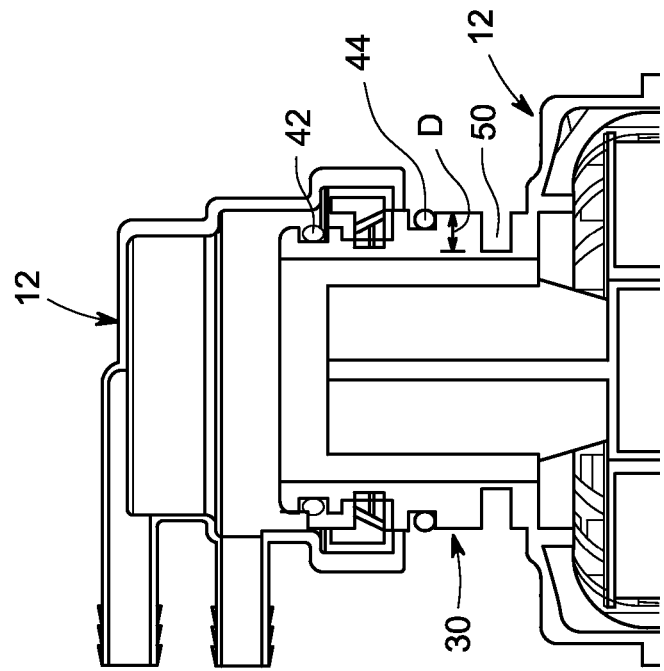
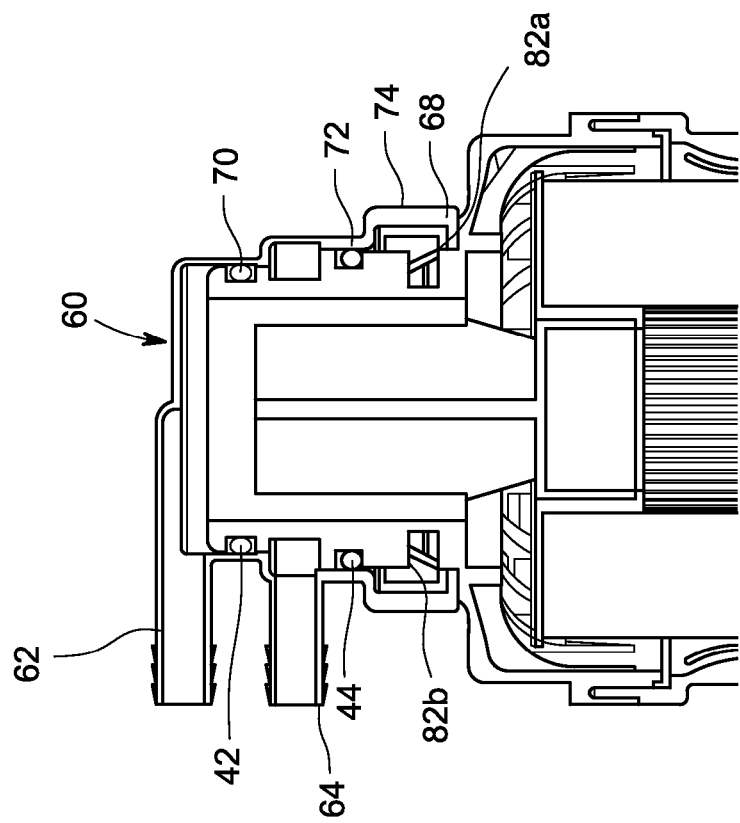

FLUID FILTER AND HEAD WITH QUICK CONNECTOR

FIELD

This disclosure generally pertains to the field of filtration, and more particularly to a design for quick connecting a fluid filter to a filter head structure.

BACKGROUND

An example of a fluid filter with a protrusion defining inlet and outlet flow passages is disclosed in US Patent Application Publication No. 2010/0200490. In the filters described in US 2010/0200490, rotation of the fluid filter or the head relative to one another may be necessary to detach the fluid filter from the head. In situations where the head is rotated while the fluid filter is fixed, detaching fluid lines from the head may be necessary. However, detaching the fluid lines may be difficult or not desirable.

SUMMARY

A connection between a fluid filter and a head is described that permits quick connection/disconnection between the two without requiring disconnection of fluid lines from the head. The head includes a lock to connect head, and thus the inlet and outlet fluid lines, to a fluid filter using a non-threaded attachment method. The lock that retains the head to the fluid filter is resilient to allow for manual connection and disconnection, with or without the aid of tools.

The head has fluid inlet and outlet ports to which fluid lines attach to flow unfiltered fluid into and filtered fluid out of the fluid filter when the head is connected to the fluid filter. The head closes the fluid filter, which has a protrusion with adjacent passageways that guide and separate unfiltered from filtered fluid.

The fluid systems that can utilize the described fluid filter, head, and/or connection between the fluid filter and head can be any number of fluid systems including, but not limited to, a fuel filtration system, for example on an engine such as a diesel or gasoline engine, a hydraulic fluid filtration system in a hydraulic system, other engine fluid filtration systems on diesel or gasoline engines, as well as filtration systems used in non-engine applications. In one exemplary application, the fluid filter is used in a fuel system for filtering fuel, for example diesel fuel.

In one embodiment, the head can be a topcap that is detachably connected to the fluid filter which is fixed in position in the fluid system. In another embodiment, the head is a structure that is fixed within the fluid system, for example fixed to an engine block, and the fluid filter is detachably connected to the head.

In an embodiment, a fluid filter includes a housing defining an interior space and a filter element disposed within the interior space of the housing, with the filter element having a filtered fluid side and an unfiltered fluid side. A protrusion extends beyond an end of the housing in a longitudinal direction away from the interior space. The protrusion defines an inlet flow passage that is in fluid communication with the unfiltered fluid side of the filter element, and an inlet to the inlet flow passage. The protrusion further defines an outlet flow passage that is in fluid communication with the filtered fluid side of the filter element and an outlet from the outlet flow passage. A first seal and a second seal are disposed on an outer surface of the protrusion and extend circumferentially around the protrusion. The first seal is spaced from the second seal in the longitudinal direction, the first seal is disposed between the inlet to the inlet flow passage and the outlet from the outlet flow passage, and the second seal is disposed between the outlet from the outlet flow passage and the end of the housing. In addition, a lock channel is formed in the outer surface of the protrusion between the second seal and the end of the housing.

In one embodiment, the lock channel can be a continuous channel that extends circumferentially about the protrusion, with the lock channel receiving a lock structure that is part of the head that locks the fluid filter to the head.

In another embodiment, the lock channel can be non-continuous, for example a first flat that is formed on the protrusion and a second flat formed on the protrusion diametrically opposite the first flat. The two flats can receive a lock structure that is part of the head that locks the fluid filter to the head.

In another embodiment, a head is configured for connection to a protrusion on a fluid filter. The head includes a housing defining an interior space that in use receives the protrusion of the fluid filter therein, with the housing including a fluid inlet port, a fluid outlet port, a closed end, and an open end. A first circumferential sealing surface is defined on an interior surface of the housing within the interior space, where the first circumferential sealing surface is disposed between the fluid inlet port and the fluid outlet port. A second circumferential sealing surface is defined on the interior surface of the housing within the interior space, where the second circumferential sealing surface is disposed between the fluid outlet port and the open end of the housing. A lock element is mounted on the housing within the interior space, and the lock element is disposed between the second circumferential sealing surface and the open end of the housing. The lock element is deformable from a first locking position to a second release position.

In another embodiment, the housing can be generally cylindrical and include a pair of openings formed therethrough at diametrically opposite locations between the second circumferential sealing surface and the open end of the housing. The lock element can include a pair of oppositely disposed tabs that are disposed within the openings in the housing, and a pair of curved side walls that extend between the tabs. Each curved side wall can include an inwardly extending locking ridge, and the locking ridges are disposed opposite one another.

In use, the protrusion on the fluid filter fits into the interior space of the head housing. The first seal on the protrusion seals with the first sealing surface, the second seal seals with the second sealing surface, and the lock element of the head engages with the lock channel on the protrusion to lock the head to the fluid filter.

DRAWINGS

FIG. 3 is a detailed cross-sectional view showing the connection between the head and the fluid filter.

FIG. 4 shows the head at a beginning stage of connection to the fluid filter.

DETAILED DESCRIPTION

Figure 1:
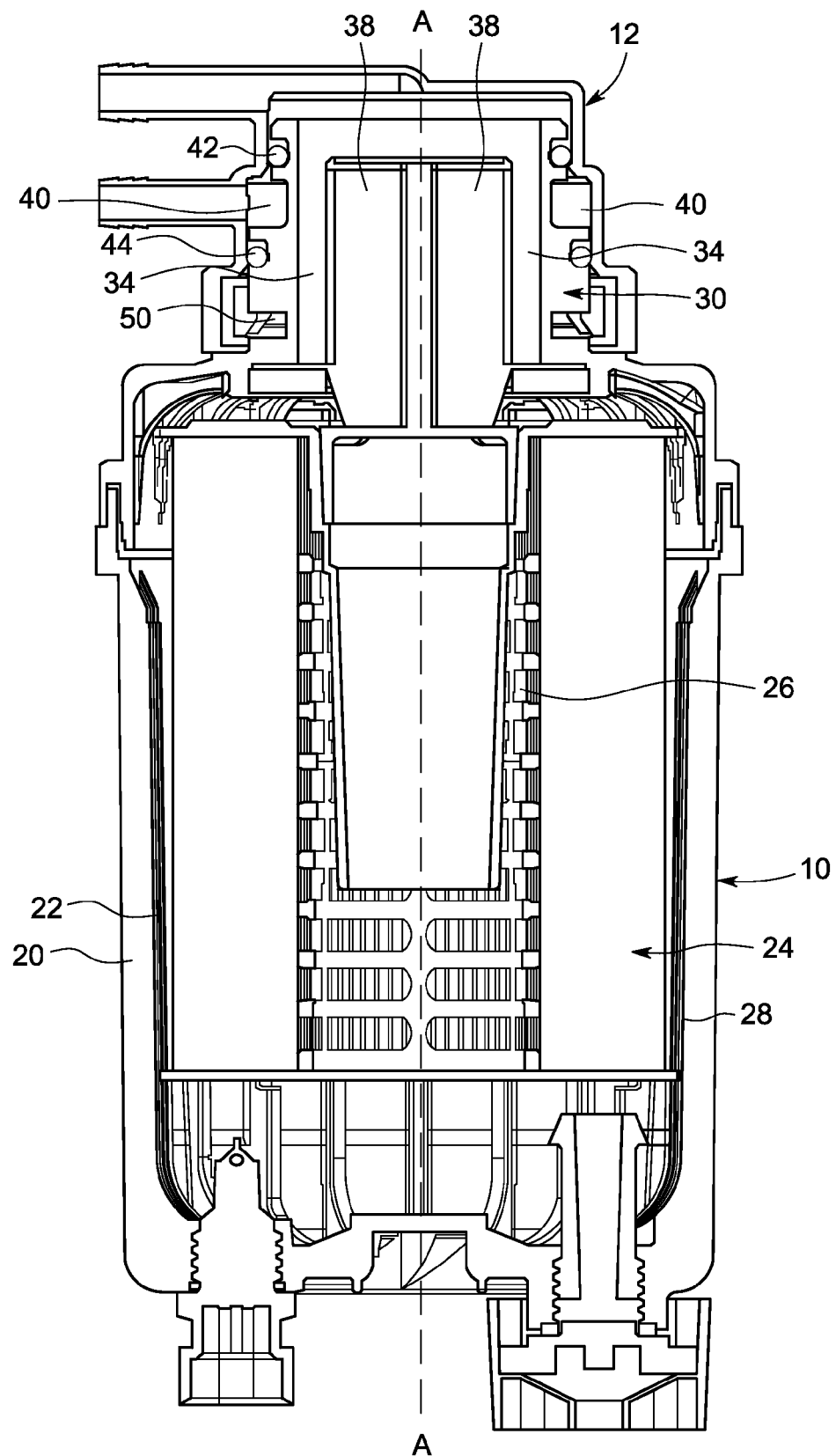
FIG. 1 is a cross-sectional view of a fluid filter connected to a head having a quick connector.
Figure 2:
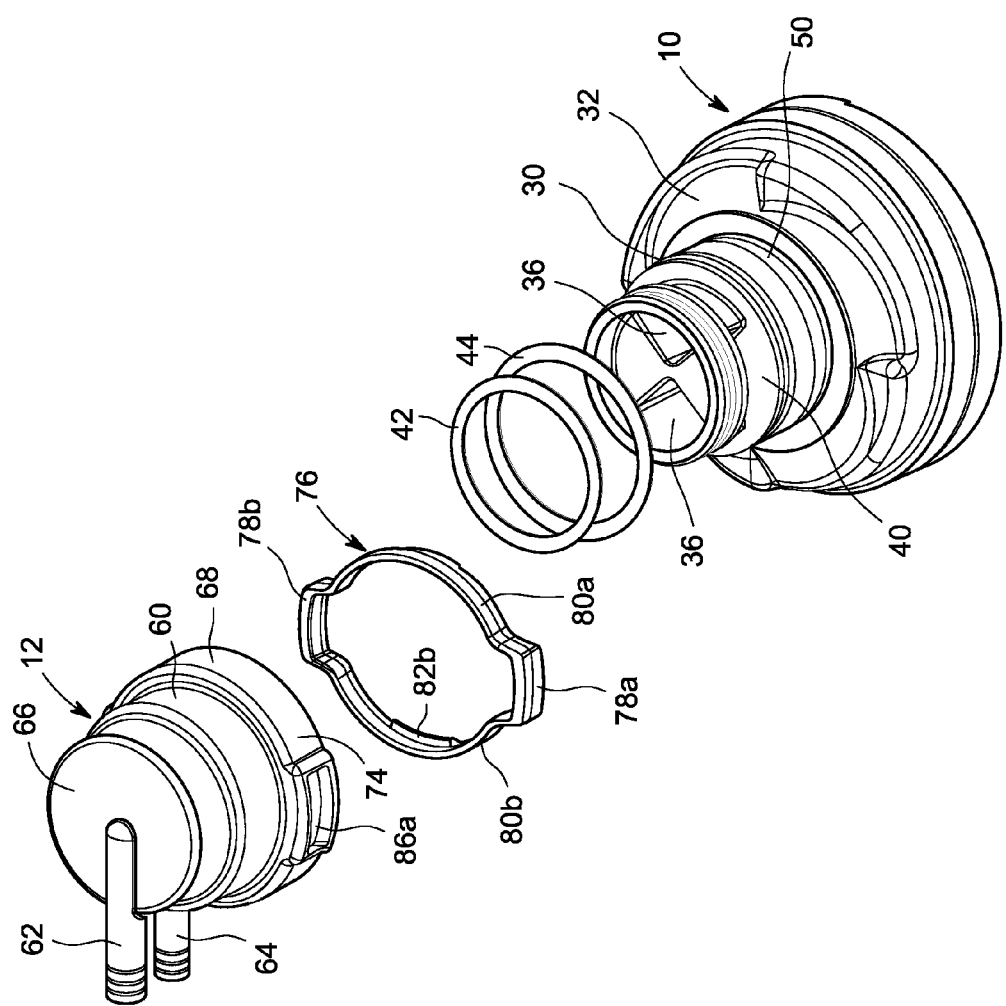
FIG. 2 is a partial, exploded, perspective view showing the connection between the fluid filter and the head.

With reference initially to FIGS. 1 and 2, a quick connection between a fluid filter 10 and a head 12 is illustrated. The fluid filter 10, the head 12, and/or connection between the fluid filter and the head can be used in any number of fluid systems including, but not limited to, a fuel filtration system, for example on an engine such as a diesel or gasoline engine, an oil filtration system in a lubrication system, a hydraulic fluid filtration system in a hydraulic system, other engine fluid filtration systems on diesel or gasoline engines, as well as filtration systems used in non-engine applications. In one exemplary application, the fluid filter 10 is used in a fuel system for filtering fuel, for example diesel fuel.

The fluid filter 10 includes a housing 20 defining an interior space 22. A cylindrical filter element 24 is disposed within the interior space and in the illustrated example has a filtered fluid side 26 and an unfiltered fluid side 28 so that the filter element 24 will be recognized as an outside-in type filter element. A protrusion 30 extends from an end 32 of the housing 20 in a longitudinal direction A-A away from the interior space 22. The protrusion 30 defines an inlet flow passage 34 (in the illustrated example, two inlet flow passages 34) that is in fluid communication with the unfiltered fluid side 28 of the filter element, and an inlet 36 (in the illustrated example, two inlets 36) to the inlet flow passage 34. The protrusion 30 further defines an outlet flow passage 38 (in the illustrated example, two outlet flow passages 38) that is in fluid communication with the filtered fluid side 26 of the filter element and an outlet 40 (in the illustrated example, two outlets 40) from the outlet flow passage 38.

A first o-ring seal 42 and a second o-ring seal 44 are disposed in corresponding grooves on an outer surface of the protrusion 30 and extend circumferentially around the protrusion. As evident from FIG. 1, the first seal 42 is spaced from the second seal 44 in the longitudinal direction A-A, the first seal 42 is disposed between the inlet 36 to the inlet flow passage 34 and the outlet 40 from the outlet flow passage, and the second seal 44 is disposed between the outlet 40 from the outlet flow passage 38 and the end 32 of the housing.

The fluid filter 10 described so far in the preceding two paragraphs is conventional and further described in US 2010/0200490 which is incorporated herein by reference in its entirety.

One difference between the fluid filter 10 and the fluid filter described in US 2010/0200490 is that a lock channel 50 is formed in the outer surface of the protrusion between the second seal 44 and the end 32 of the housing 20. The lock channel 50 is configured to receive a portion of a lock element on the head 12, as will be described further below, for removably locking the fluid filter 10 to the head 12.

In the example illustrated in the figures, the lock channel 50 is a continuous recess or channel that extends circumferentially around the protrusion 30. However, other configurations of the lock channel 50 are possible as long as the lock channel 50 is capable of engaging with the lock element on the head to lock the fluid filter to the head. For example, the lock channel 50 need not be circumferentially continuous but can be formed by a pair of oppositely disposed flats formed in the protrusion. The flats would permit locking with the lock element described below, but rotation of the fluid filter or the head approximately 90 degrees in either direction would remove the lock element from the flats to permit disconnection of the fluid filter from the head.

With reference to FIG. 4, the lock channel 50 has a depth D (i.e. extends a distance radially inward toward the longitudinal axis A-A of the housing) that is greater than a depth of the groove in which the second seal 44 is disposed. Further, the radial thickness or depth of the protrusion beneath the outlet 40 is enlarged to accommodate the lock channel 50. As a result, the second seal 44 has a diameter that is greater than a diameter of the first seal 42.

The head 12 may be made from a plastic material or made from a metal. The head 12 is configured to fluidly connect fluid lines to the fluid filter 10 using a non-threaded attachment method. The head 12 illustrated in the figures is a topcap structure that presses over the protrusion 30 at top of the fluid filter and is attached thereto by means of the lock element which prevents the topcap from separating from the fluid filter during intended use. During connection/disconnection, the topcap is movable relative to the fluid filter which is detachably fixed in place on a support structure such as an engine block. Instead of a topcap, the head can be a fixed head structure that is fixed to a support structure, such as being integrated into an engine block, so that the fluid filter is movable relative to the head during connection/disconnection.

The head 12 has an inlet and an outlet to which fluid lines attach to flow unfiltered fluid into and filtered fluid out of the fluid filter when the head 12 is connected to the fluid filter. The head 12 may also have additional ports for air venting, pressure sensor/switch, heater, etc.

As shown in FIGS. 1 and 2, the head 12 includes a generally cylindrical housing 60 defining an interior space that in use receives the protrusion 30 of the fluid filter therein. The housing includes a fluid inlet port 62, a fluid outlet port 64, a closed end 66, and an open end 68 through which the protrusion 30 is received. The ports 62, 64 may be located anywhere on the head 12 that does not interfere with the attachment to the fluid filter and that can receive their respective fluid flows. The ports 62, 64 may be integrally formed as a one-piece construction with the head or formed as separate pieces that are attached to the head.

With reference to FIG. 3, a first circumferential sealing surface 70 is defined on the interior surface of the housing 60 within the interior space. The sealing surface 70 is designed to seal with the seal 42 on the fluid filter 10. The sealing surface 70 is disposed between the fluid inlet port 62 and the fluid outlet port 64 to seal filtered fluid from unfiltered fluid. A second circumferential sealing surface 72 is defined on the interior surface of the housing 60 within the interior space. The sealing surface 72 is designed to seal with the seal 44 on the fluid filter 10. The sealing surface 72 is disposed between the fluid outlet port 64 and the open end 68 of the housing 60 to prevent escape of fluid between the head and the fluid filter to the exterior.

Figure 7:
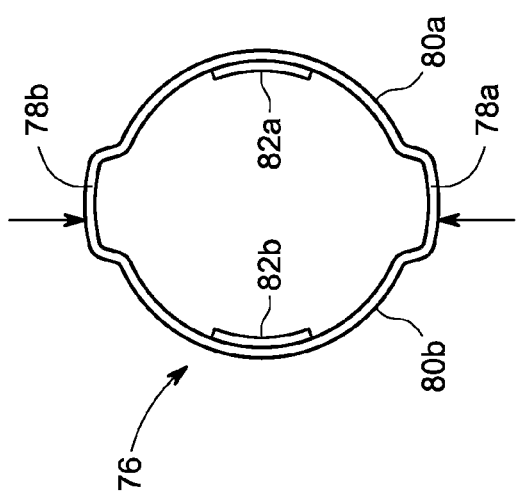
FIG. 7 is a top view of the quick connector in an expanded state.

The head 12 adjacent to the open end 68 includes a radially enlarged section 74 beneath the sealing surface 72. The enlarged section 74 accommodates a lock element 76 that is best seen in FIGS. 2 and 7. In one embodiment, the lock element 76 is configured to detachably lock the head 12 and the fluid filter 10 to each other. In the illustrated embodiment, the lock element is configured to snap-fit connect the head to the fluid filter. The lock element 76 is mounted on the housing within the interior space, and is disposed between the second circumferential sealing surface 72 and the open end 68 of the housing.

As shown in FIGS. 2 and 7, the lock element 76 includes a pair of oppositely disposed tabs 78a, 78b and a pair of curved side walls 80a, 80b that extend between the tabs. The curved side walls 80a, 80b include inwardly extending locking ridges 82a, 82b, on an inner surface thereof that are disposed opposite one another and face each other. As shown in FIGS. 1 and 3, when the head 12 is fully installed on the fluid filter 10, the locking ridges 82a, 82b snap fit connect into the lock channel 50 to prevent disconnection of the head 12 and the fluid filter 10 until the locking ridges 82a, 82b are displaced or removed from the lock channel.

In the illustrated example, the lock element 76 is made of a material, such as plastic or metal, that permits the lock element to resiliently deform from a primary or first, locking position or configuration (shown in FIG. 2) to a second, release position or configuration (shown in FIG. 7). In the first, locking position, the lock element 76 has a generally oval shape whereby the locking ridges 82a, 82b are at a radially inwardmost position. By pressing inwardly on the tabs 78a, 78b in the directions of the arrows shown in FIG. 7, the diameter of the side walls 80a, 80b is increased and the locking ridges 82a, 82b are forced to a radially outwardmost position. When the pressing force is released, the lock element returns back to its original or primary oval configuration.

The head 66 is prevented from rotation by the inlet port 62 and the outlet port 64 which have a fixed position. The fluid filter 10 can also be prevented from rotation, for example by hose clamps that hold the filter in place against the frame of the vehicle or other structure in which the fluid filter is used. The lock element 76 is manufactured with a diameter that causes a slight interference fit of the locking ridges 82a, 82b with the lock channel 50, and there is always a slight pressure keeping the locking ridges 82a, 82b firmly within the lock channel 50. To disconnect, the tabs 78a, 78b must be fully depressed to allow disengagement of the locking ridges 82a, 82b from the lock channel 50.

Figure 6:
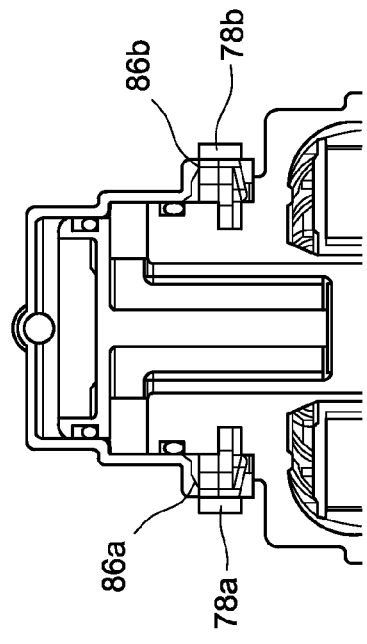
FIG. 6 is a cross-sectional view rotated 180 degrees from the view of FIG. 3 showing the tabs at opposite ends of the quick connector.

As shown in FIGS. 2 and 6, the radially enlarged section 74 of the housing 60 includes a pair of openings 86a, 86b formed therethrough at diametrically opposite locations between the second circumferential sealing surface 72 and the open end 68 of the housing. The lock element 76 is disposed within the radially enlarged section 74 such that the tabs 78a, 78b extend into and at least partially through the openings 86a, 86b such that the tabs are accessible manually or using a tool(s) to apply the inwardly opposed pressing forces to expand the diameter of the lock element. In the illustrated example, the tabs 78a, 78b extend all the way through the openings 86a, 86b with ends of the tabs 78a, 78b projecting a distance beyond the housing 60 to make the tabs 78a, 78b more readily accessible for application of the pressing forces.

Figure 5:
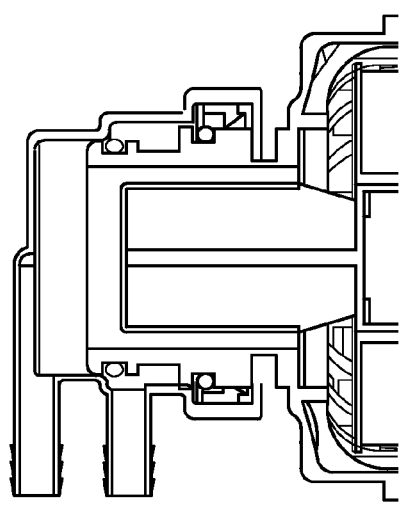
FIG. 5 shows the head at an intermediate stage of connection to the fluid filter.

FIG. 4 illustrates the head 12 initially being installed over the protrusion 30 on the fluid filter 10. FIG. 5 shows an intermediate stage of connection. FIGS. 1, 3, and 6 show the head connected to the fluid filter. As the head 12 is being installed, the angled inner surface of the locking ridges 82a, 82b can slide over the outer surface of the protrusion and be forced outwardly to allow the locking element to pass over the protrusion. Once the locking ridges 82a, 82b reach the lock channel 50, the ridges 82a, 82b snap into the lock channel 50 to lock the head 12 to the fluid filter 10. To disconnect, the tabs 78a, 78b are pressed inwardly as shown in FIG. 7, which expands the ridges 82a, 82b removing them from the lock channel 50. The head 12 can then be lifted from the fluid filter. Over time, the o-rings 42, 44 may swell causing the rubber to stick to the head. If this occurs, a twisting motion can be used to break the o-rings free from the surface of the head.

In addition, if the lock channel is not circumferentially continuous but is formed for example by a pair of oppositely disposed flats, relative rotation between the head 12 and the filter 10 can be used to achieve connection/disconnection. In this embodiment, with the ridges 82a, 82b in place in the flats of the lock channel 50 to lock the head 12 to the fluid filter 10, relative rotation between the head 12 and the filter 10 will cause the ridges to slide out of the flats and onto the larger diameter of the protrusion 30 between the flats. This will force the lock element 76 to expand radially, allowing the filter 10 and the head 12 to be disconnected from one another. A new filter 10 can then be installed in the reverse manner, or by initially installing the filter so that the flats thereof line up with the ridges 82a, 82b, so that the ridges snap into place into the flats without requiring relative rotation between the head 12 and the filter 10. Further, instead of using relative rotation to remove the filter, one can press inwardly on the tabs 78a, 78b to remove the ridges 82a, 82b from the flats to permit disconnection.

Because the lock element 76 and lock channel 50 are used to attach the head and the filter, no threads are required for attachment. Therefore, the protrusion 30 is devoid of threads between the second seal 44 and the end of the housing, and is preferably entirely devoid of threads. Likewise, the interior surface of the housing of the head is devoid of threads between the second circumferential sealing surface and the open end, and the interior surface of the head is preferably entirely devoid of threads.

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid filter, comprising:
a housing defining an interior space;
a filter element disposed within the interior space of the housing, the filter element having a filtered fluid side and an unfiltered fluid side;
a protrusion extending beyond an end of the housing in a longitudinal direction away from the interior space; the protrusion defining an inlet fluid flow passage that is in fluid communication with the unfiltered fluid side of the filter element, and an inlet to the inlet fluid flow passage; the protrusion further defining an outlet fluid flow passage that is in fluid communication with the filtered fluid side of the filter element and an outlet from the outlet fluid flow passage;
a first seal and a second seal disposed on an outer surface of the protrusion and extending circumferentially around the protrusion, the first seal is spaced from the second seal in the longitudinal direction, the first seal is disposed between the inlet to the inlet fluid flow passage and the outlet from the outlet fluid flow passage, and the second seal is disposed between the outlet from the outlet fluid flow passage and the end of the housing; and
a lock channel formed in the outer surface of the protrusion between the second seal and the end of the housing.

2. The fluid filter of claim 1, wherein the protrusion is integrally formed with the housing.

3. The fluid filter of claim 1, wherein the lock channel is a continuous channel that extends circumferentially about the protrusion, or the lock channel is non-continuous.

4. The fluid filter of claim 1, wherein the second seal has a diameter that is greater than a diameter of the first seal.

5. The fluid filter of claim 1, wherein the protrusion is devoid of threads between the second seal and the end of the housing.

6. The fluid filter of claim 5, wherein the protrusion is entirely devoid of threads.

7. The fluid filter of claim 1, wherein the filter element is configured to filter fuel, oil or hydraulic fluid.

8. The fluid filter of claim 1, wherein the second seal is disposed within a groove formed in the protrusion, and wherein the lock channel has a depth that is greater than a depth of the groove in which the second seal is disposed.

9. A head configured for connection to a protrusion on a fluid filter, the head comprising:
   a housing defining an interior space that in use receives the protrusion of the fluid filter therein, the housing includes a fluid inlet port, a fluid outlet port, a closed end, and an open end;
   a first circumferential sealing surface defined on an interior surface of the housing within the interior space, the first circumferential sealing surface is disposed between the fluid inlet port and the fluid outlet port;
   a second circumferential sealing surface defined on the interior surface of the housing within the interior space, the second circumferential sealing surface is disposed between the fluid outlet port and the open end of the housing; and
   a lock element mounted on the housing within the interior space, the lock element is disposed between the second circumferential sealing surface and the open end of the housing, the lock element is deformable from a first locking position to a second release position.

10. The head of claim 9, wherein the head is a topcap.

11. The head of claim 9, wherein the second circumferential sealing surface has a diameter that is greater than a diameter of the first circumferential sealing surface.

12. The head of claim 9, wherein the interior surface of the housing is devoid of threads between the second circumferential sealing surface and the open end.

13. The head of claim 12, wherein the interior surface of the housing is entirely devoid of threads.

14. A head configured for connection to a protrusion on a fluid filter, the head comprising:
   a housing defining an interior space that in use receives the protrusion of the fluid filter therein, the housing includes a fluid inlet port, a fluid outlet port, a closed end, and an open end;
   a first circumferential sealing surface defined on an interior surface of the housing within the interior space, the first circumferential sealing surface is disposed between the fluid inlet port and the fluid outlet port;
   a second circumferential sealing surface defined on the interior surface of the housing within the interior space, the second circumferential sealing surface is disposed between the fluid outlet port and the open end of the housing; and
   a lock element mounted on the housing within the interior space, the lock element is disposed between the second circumferential sealing surface and the open end of the housing, the lock element is deformable from a first locking position to a second release position,
   wherein the housing is generally cylindrical and includes a pair of openings formed therethrough at diametrically opposite locations between the second circumferential sealing surface and the open end of the housing; and the lock element includes a pair of oppositely disposed tabs that are disposed within the openings in the housing, and a pair of curved side walls that extend between the tabs; each curved side wall includes an inwardly extending locking ridge, and the locking ridges are disposed opposite one another.

* * * * *